US012651842B2

(12) United States Patent
Vosoogh et al.

(10) Patent No.: US 12,651,842 B2
(45) Date of Patent: Jun. 9, 2026

(54) TRANSITION ARRANGEMENT FOR A TRANSITION BETWEEN TWO RIDGE GAP WAVEGUIDES

(71) Applicant: Gapwaves AB, Gothenburg (SE)

(72) Inventors: Abbas Vosoogh, Gothenburg (SE); Julius Petersson, Gothenburg (SE); Esperanza Alfonso Alós, Vastra Frolunda (SE)

(73) Assignee: Gapwaves AB, Göteborg. (SE)

( * ) Notice: Subject to any disclaimer, the term of this patent is extended or adjusted under 35 U.S.C. 154(b) by 120 days.

(21) Appl. No.: 18/843,422

(22) PCT Filed: Mar. 2, 2023

(86) PCT No.: PCT/SE2023/050190
§ 371 (c)(1),
(2) Date: Sep. 3, 2024

(87) PCT Pub. No.: WO2023/167627
PCT Pub. Date: Sep. 7, 2023

(65) Prior Publication Data

US 2025/0183544 A1 Jun. 5, 2025

(30) Foreign Application Priority Data

Mar. 3, 2022 (SE) .................................... 2230061-0

(51) Int. Cl.
*H01Q 13/20* (2006.01)
*H01Q 1/27* (2006.01)

(52) U.S. Cl.
CPC ............... *H01Q 13/20* (2013.01); *H01Q 1/27* (2013.01)

(58) Field of Classification Search
CPC ........... H01P 1/042; H01Q 13/20; H01Q 1/27
See application file for complete search history.

(56) References Cited

U.S. PATENT DOCUMENTS 8,576,023 B1 11/2013 Buckley et al.
2019/0036230 A1 1/2019 Kirino et al.
(Continued)

FOREIGN PATENT DOCUMENTS

JP 2021158643 A 10/2021
WO 2020162818 A1 8/2020

OTHER PUBLICATIONS

European Search Report issued by the European Patent Office on Jan. 28, 2026 in corresponding European Patent Application No. 23763792.1 (5 pages).

*Primary Examiner* — Quan Tra
(74) *Attorney, Agent, or Firm* — Panitch Schwarze Belisario & Nadel LLP

(57) ABSTRACT

A transition arrangement (100) comprising a first conductive layer (110), a second conductive layer (120), and a third conductive layer (130) in a stacked layer configuration. The first conducive layer (110) comprises a first ridge (111) arranged along a first waveguiding path, and a first metamaterial structure (113) arranged along a perimeter of the first waveguide path. The second conducive layer (120) comprises a second ridge (121) arranged along a second waveguiding path, and a second metamaterial structure (123) arranged along a perimeter of the second waveguide path. The third conductive layer (130) is arranged in between the first and the second conductive layers (110, 120). The third conductive layer comprises respective planar surfaces facing the first and the second first metamaterial structures (113,123), respectively. The third conductive layer comprising an aperture (131) arranged in connection to the first and the second ridges (111,121) to couple electromagnetic waves between the first and the second ridges. The first and/or the second ridge (111,121) comprises a respec-
(Continued)

tive ridge matching section (112,122) in connection to the aperture (131) and preferably facing the aperture.

19 Claims, 4 Drawing Sheets

(56) References Cited

U.S. PATENT DOCUMENTS

| | | | | |
|---|---|---|---|---|
| 2019/0074569 | A1* | 3/2019 | Kamo | H01P 5/222 |
| 2019/0109361 | A1* | 4/2019 | Ichinose | H01P 3/123 |
| 2020/0044360 | A1 | 2/2020 | Kamo et al. | |

* cited by examiner

TRANSITION ARRANGEMENT FOR A TRANSITION BETWEEN TWO RIDGE GAP WAVEGUIDES

TECHNICAL FIELD

The present disclosure relates to wireless communication systems in general, and to waveguide transmission mediums in particular. There are disclosed arrangements to transit a signal from a first ridge waveguide to a second ridge waveguide.

BACKGROUND

Wireless communication networks comprise radio frequency transceivers, such as radio base stations used in cellular access networks, microwave radio link transceivers used for, e.g., backhaul into a core network, and satellite transceivers which communicate with satellites in orbit. Radar transceivers also comprise radio frequency transceivers for transmitting and receiving radio frequency signals.

A radio frequency transceiver typically comprises a plurality of waveguiding structures, such as hollow waveguides, planar transmission lines etc., to distribute signals within the transceiver. Commonly, a plurality of signals from one or more integrated circuits need to be distributed to a plurality of radiation apertures arranged in various groups in an antenna arrangement. Waveguides are often implemented as hollow metal pipes or metallized tubular structures, and are commonly used at microwave and millimeter-wave, for such purposes as distributing signals.

Distribution of signals in transceiver arrangements often is often distributed across different layers. The distribution along and across different layers should present low losses, high isolation, and be compact, which is difficult to achieve.

JP2021158643A discloses a ridge waveguide to ridge waveguide transition.

However, there is a need for improved high-performance transition arrangements.

SUMMARY

It is an object of the present disclosure to provide transition arrangements for improved distribution of signals in, e.g., a radio frequency transceiver. This object is at least in part obtained a transition arrangement for a transition between two ridge gap waveguides. The transition arrangement comprises a first conductive layer, a second conductive layer, and a third conductive layer in a stacked layer configuration. The first conducive layer comprises a first ridge arranged along a first waveguiding path, and a first metamaterial structure arranged along a perimeter of the first waveguide path. The second conducive layer comprises a second ridge arranged along a second waveguiding path, and a second metamaterial structure arranged along a perimeter of the second waveguide path. The third conductive layer is arranged in between the first and the second conductive layers. The third conductive layer comprises respective planar surfaces facing the first and the second first metamaterial structures, respectively. The third conductive layer comprises an aperture arranged in connection to the first and the second ridges to couple electromagnetic waves between the first and the second ridges. The first and/or the second ridge comprises a respective ridge matching section in connection to the aperture and preferably facing the aperture.

The disclosed transition arrangement is particularly suitable for signal distribution in an antenna arrangement. The disclosed transition arrangement enables a low-complexity transition that is easy and inexpensive to manufacture, which is highly desirable in large-volume production. The third conductive layer can, e.g., be a thin metal layer, where the aperture is stamped, etched, or milled onto it.

The ridge matching sections provides a transition that maintains impedance matching along the overall waveguiding path across the different layers. Thus, there is little reflections at each interface, i.e., from a ridge into the aperture and from the aperture to a ridge. The matching section furthermore provides a low-loss transition. The matching section provides wide impedance matching between two ridge gap waveguides via a coupling aperture.

The metamaterial structure (such as a plurality of protruding pins) efficiently seals the passage along the intended waveguide paths such that electromagnetic energy can pass more or less unhindered from the first waveguiding path to the second waveguiding path via the aperture, and vice versa. The transition between the layers can be contactless in that no electrical contact is required between any of the first, second, and third layer. This is an advantage since high precision assembly is not necessary. The layers can simply be attached to each other with fastening means such as bolts or the like, where electrical contact need not be verified.

According to aspects, the aperture is arranged less than a half of wavelength of an operational frequency from a respective end of the first and/or the second ridge. This way reflected waves from the end of a ridge adds up at the aperture such that the impedance bandwidth of the transition is increased.

According to aspects, the respective extension directions of first and the second ridges are parallel. This way, the waveguiding path extending on one layer can be continued on another layer and extend in the same direction, which is desired in some signal distribution scenarios in, e.g., array antennas. According to other aspects, the first and the second ridges are mirrored with respect to the aperture. This way, the waveguiding path extending on one layer can be continued on another layer and be directed back in the opposite direction. According to different aspects, the respective extension directions of first and the second ridges are angled with respect to each other. This way, the waveguiding path extending on one layer can be continued on another layer at an angle.

According to aspects, the aperture is an elongated slot. The quasi-TEM modes of the ridge gap waveguides are matched via the elongated slot by means of the ridge matching sections.

According to aspects, the elongated slot is perpendicular with respect to a respective elongation direction of the first and/or the second ridge. This way, the perpendicular slot affects electric current on the third layer effectively and causes a strong coupling between the modes of the ridges on first and second conductive layers, respectfully. This led to a more robust and wideband transition.

According to aspects, the ridge matching section comprises a section with increased width and/or height with respect to the remainder of the ridge, where the height is in the normal direction of the conducive layer and the width is in a direction perpendicular to an extension direction of the ridge. Preferably, both the width and the height are increased. This is a particularly effective way of provides a transition that maintains impedance matching along the overall waveguiding path across the different layers.

According to aspects, a thickness of the third layer is less than a tenth of a wavelength of an operational frequency. This makes the third layer easy and cost-effective to fabricate.

According to aspects, at least a part of the third layer is in contact with the respective ridge and/or the respective metamaterial structure on the first and/or the second conducive layer. This contact may be electrical and or mechanical. Although contact is not necessary, it does not degrade performance. Furthermore, contact may in some case improve mechanical stability. The contact may be across all of the metamaterial structure of a layer, or only sections of it. According to other aspects, the third layer is arranged at a distance from the first and/or the second metamaterial structure, wherein the distance is less than a quarter of a wavelength of an operational frequency. This provide high attenuation of signals in unwanted directions, i.e., not along the first and second waveguiding paths via the aperture. This gap may be across all of the metamaterial structure of a layer, or only sections of it.

According to aspects, the first and/or the second metamaterial structure comprises a plurality of protruding conductive elements. This type of metamaterial structure is easy to manufacture and provides excellent performance in terms of, i.a., high attenuation of unwanted signal propagation.

There is also disclosed herein an antenna arrangement comprising the transition arrangement according to the discussions above. According to aspects, in the antenna arrangement, the first conducive layer comprises a third ridge arranged on an opposite surface on the layer compared to the first ridge, and/or the second conducive layer comprises a fourth ridge arranged on an opposite surface on the layer compared to the second ridge.

Furthermore, there is disclosed herein a radio or radar transceiver comprising the transition arrangement and/or the antenna arrangement. In addition, there is disclosed herein a vehicle comprising the transition arrangement, the antenna arrangement, and/or the radio or radar transceiver.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

The present disclosure will now be described in more detail with reference to the appended drawings, where.

DETAILED DESCRIPTION

Figure 1:
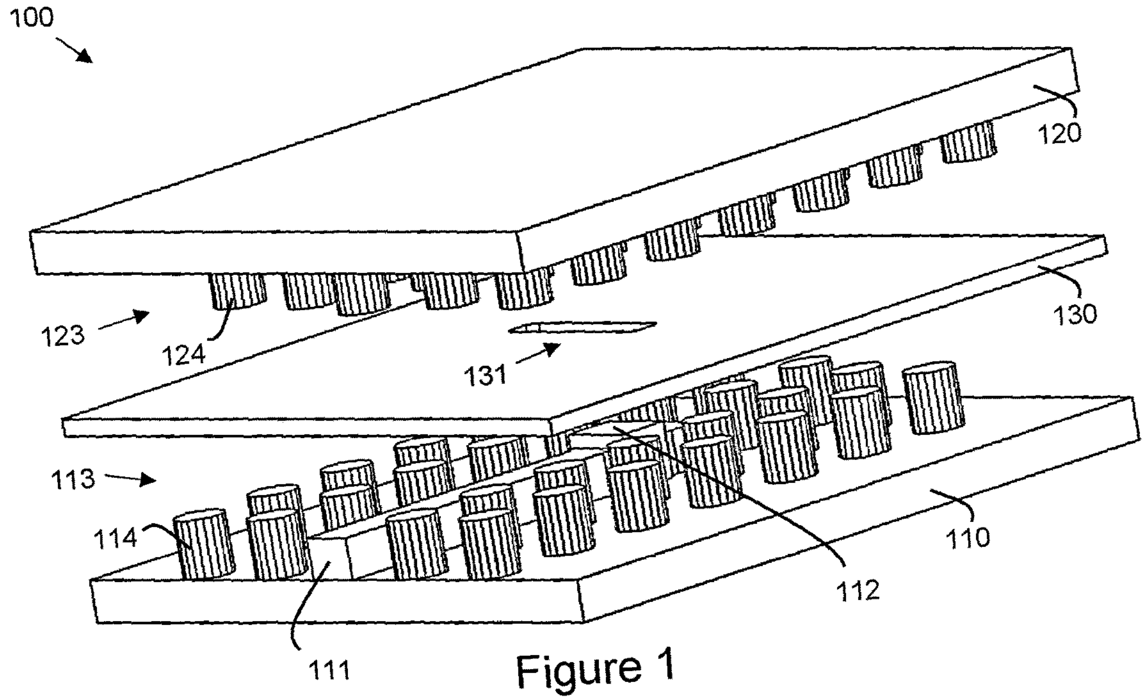
FIGS. 1-3 show different views of an example transition arrangement.

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 8A:
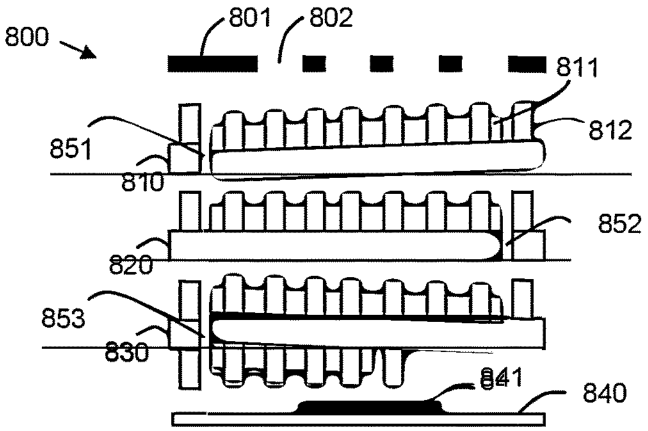
FIGS. 8A-8B schematically illustrate example antenna arrangements.

FIG. 8A shows an example antenna arrangement 800 with integrated circuit (IC) 841 comprised on a printed circuit board 840. The arrangement comprises a radiation layer 801 with slots 802. Three distribution layers 810, 820, and 830 distribute signals between the slots and the IC. Each distribution layer comprises one or more ridge gap waveguides comprising ridges 811 and protruding pins 812, where the pins constitute a metamaterial structure. The IC is connected a patch antenna which couples a signal to a ridge of on third layer 830. This ridge leads the signal to a transition 853 which a ridge-to-ridge transition that transitions form a ridge on one side of a layer via a through hole to another ridge of the same layer on the opposite side. The signal is then led along a ridge to transition 852 which is another type of ridge-to-ridge transition. The signal is then led along a ridge to transition 851, which is similar to transition 852. Finally, the ridge facing the radiation layer distributes the signal to the slots.

Figure 8B:
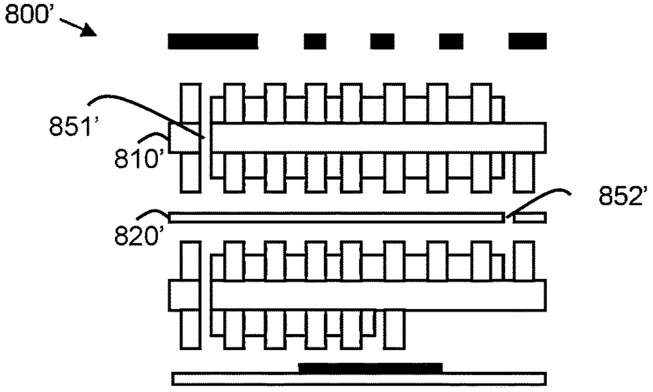

FIG. 8B shows a modified antenna arrangement 800' compared to the arrangement 800 in FIG. 8A. The antenna arrangement 800' comprises a first layer 810' with ridges on both sides. The arrangement 800' comprises a second layer 820' comprising planar surfaces facing the first and second layers, respectfully. The second layer 820' comprises transition 852' which is a third type of ridge-to-ridge transition. Compared to antenna arrangement 800, the modified antenna arrangement 800' only comprises two layers with a relatively complex structure, compared to arrangement 800 which comprises three. If these layers complex layers are manufactured by plastic mold injection, e.g., arranging ridges and protruding pins on both sides does not particularly increase manufacturing complexity compared to if only one side comprises such structures. However, the layer 820' can, e.g., be a thin metal layer, which is much less expensive and complicated to manufacture than the layers with ridges and pins. Therefore, the modified antenna arrangement 800' is easier and less expensive to produce compared to the antenna arrangement 800. The configuration of the modified antenna arrangement 800' is enabled by the transition 852'.

Figure 2:
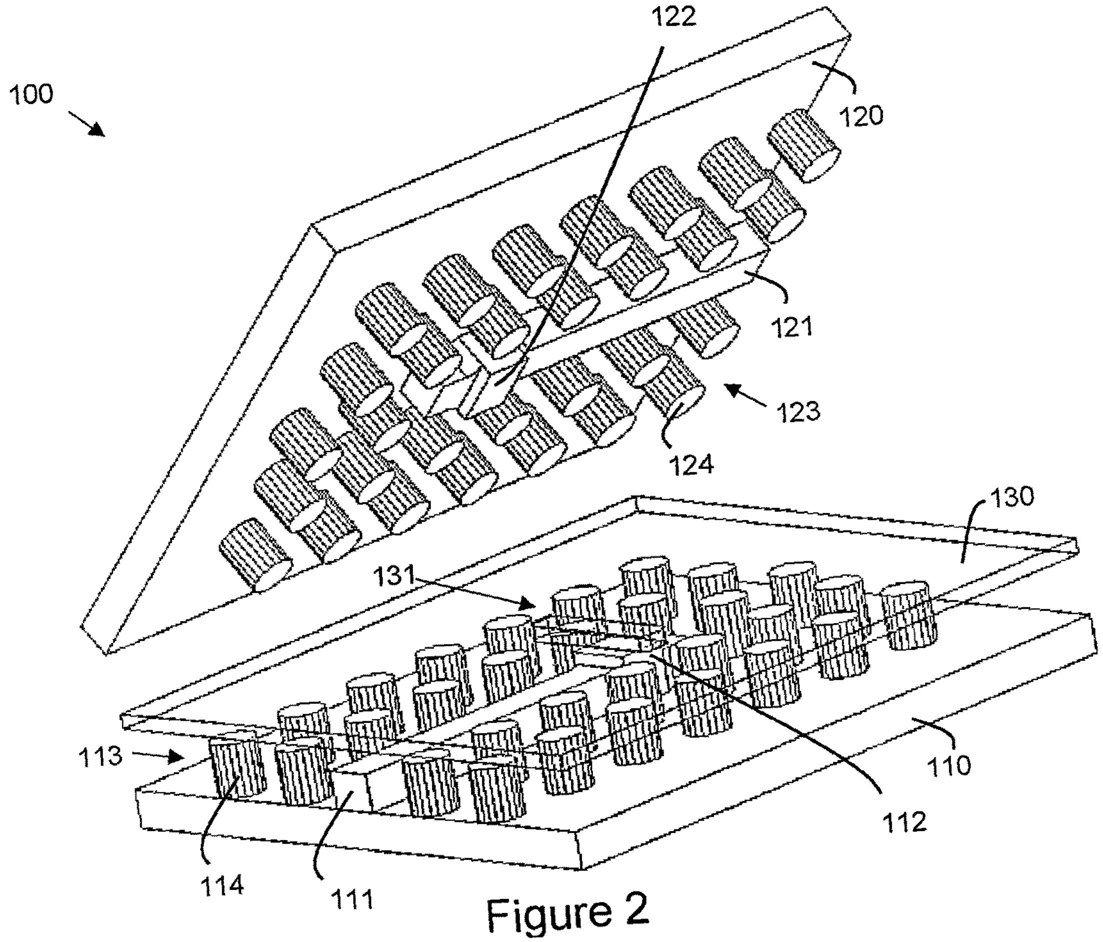
Figure 3:
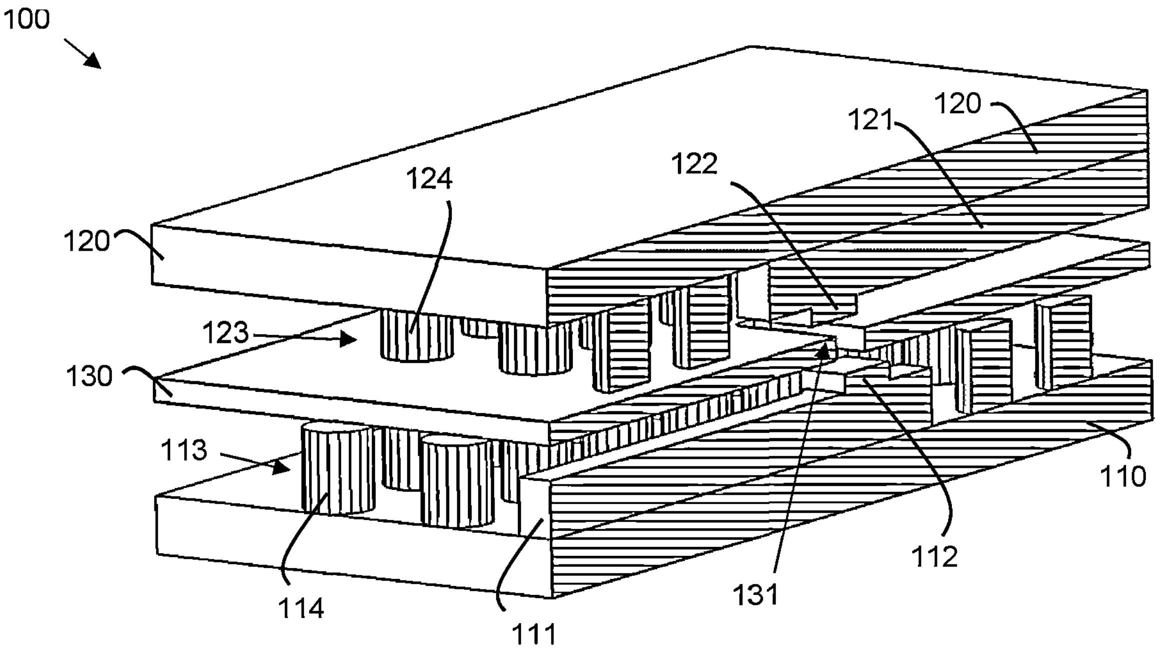
Figure 4:
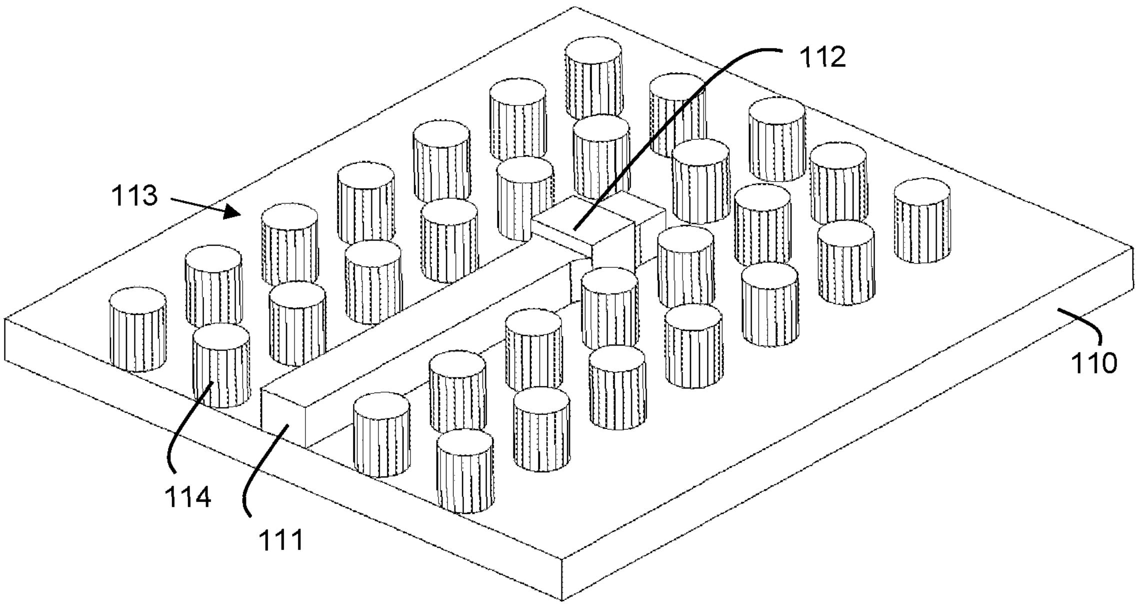
FIG. 4 shows an example layer of the transition arrangement comprising a ridge.

Therefore, there is disclosed herein a transition arrangement 100 for a transition between two ridge gap waveguides. FIGS. 1-3 show different views of an example transition arrangement 100. FIG. 1 shows the arrangement where the layers separation distances are exaggerated. FIG. 2 shows the arrangement where the top layer is angled and where the middle layer is transparent. FIG. 3 shows a cutout of the arrangement along the ridges. FIG. 4 shows a single layer comprised in the example of FIGS. 1-3. The transition arrangement comprises a first conductive layer 110, a second conductive layer 120, and a third conductive layer 130 in a stacked layer configuration. The first conducive layer 110 comprises a first ridge 111 arranged along a first waveguiding path, and a first metamaterial structure 113 arranged along a perimeter of the first waveguide path. The second conducive layer 120 comprises a second ridge 121 arranged along a second waveguiding path, and a second metamaterial structure 123 arranged along a perimeter of the second waveguide path. The third conductive layer 130 is arranged in between the first and the second conductive layers 110, 120. The third conductive layer comprises respective planar surfaces facing the first and the second first metamaterial structures 113,123, respectively. The third conductive layer comprises an aperture 131 arranged in connection to the first and the second ridges 111,121 to couple electromagnetic waves between the first and the second ridges. The first and/or the second ridge 111,121 comprises a respective ridge matching section 112,122 in connection to the aperture 131 and preferably facing the aperture.

The first ridge 111, the first metamaterial structure 113, and third conductive layer 130 together form a first ridge gap waveguide which forms the first waveguiding path. Similarly, the second ridge 112, the second metamaterial structure 123, and third conductive layer 130 together form a second ridge gap waveguide which forms the second wave guiding path. The metamaterial structure is preferably arranged to form a high-impedance surface in a frequency band, and may, e.g., comprise protruding conductive pins, which is discussed in more detail below. The metamaterial structures 113,123 are arranged to attenuate electromagnetic signal propagation in a frequency band in any other direction than along intended waveguiding paths. The intended overall waveguiding path is along the first waveguiding path, through the aperture, and along the second waveguiding path.

The stacked layered structure of the transition arrangement 100 comprises a plurality of layers. Each layer has two sides, or faces, and is associated with a thickness. The thickness is much smaller than the dimension of the faces. According to some aspects, a layer is rectangular or square. However, more general shapes are also applicable, including circular or elliptical disc shapes. The stacked layered structure is stacked in the sense that layers are arranged on top of each other. In other words, the layered structure can be seen as a sandwich structure. Each layer is preferably flat, but can also be arcuate.

The third conductive layer comprises respective planar surfaces. In a preferred embodiment, the third layer is thin metal layer where the aperture 131 is stamped, etched, or milled onto it. The layer is preferably thin compared to the first or second layers. According to aspects, the third conductive layer is less than a quarter of the height of the first and or second ridge, where the height of the ridge is in a normal direction to a layer. According to other aspects, the thickness of the third layer 130 is less than a tenth of a wavelength of an operational frequency. Herein, the operational frequency can be the center frequency in a band, but, according to other aspects, it can be any of the edges in the frequency band.

As mentioned, the metamaterial structure is preferably arranged to form a high-impedance surface. Similarly, the third conductive layer is arranged to form a low-impedance surface (which is in contrast to a high-impedance surface from a metamaterial structure). The planar surface is not a metamaterial structure. Similarly, a metamaterial structure is not a planar surface due to its periodic or quasi periodic nature. Metamaterial structures are discussed in more detail below.

Preferably, the two faces of the of the third conductive layer are flat and smooth. For example in the sense that they comprise no parts extending in a normal direction from the surface that is larger than a tenth of the thickness of the third layer or a tenth of the wavelength of the operational frequency.

As is shown in example arrangement in FIGS. 1-3, the first ridge 111 extends from an edge along the first layer conductive layer 110 to about the center of the first layer, where is has an end, i.e., a termination. The first ridge matching section 112 is arranged in connection to an end of the first ridge. The aperture 131 of the third conductive layer is arranged facing the first ridge matching section.

According to aspects, the aperture 131 is arranged less than half a wavelength of the operational frequency from a respective end of the first and/or the second ridge 111,121. This may, e.g., be measured from a center of the aperture. In general, however, the (first and/or second) ridge can extend past the (first and/or second) ridge matching section and does not necessarily have an end in connection to the aperture. Preferably though, the (first and/or second) ridge matching section is arranged in connection to an end of the corresponding ridge and the aperture is arranged facing both ridge matching sections. Here, facing can mean that the center of the aperture is facing a center of a ridge matching section. In other words, a line extending in a normal direction of the layer from the center of the of the ridge matching section intersects with the center of the aperture. Preferably, the ridge matching section is arranged at a distance between half to quarter of wavelengths from the end. This way the reflected waves from end of ridges adds up at coupling slot and increases the impedance bandwidth of the transition.

Referring back to FIGS. 1-3, the first waveguide path starts at the edge of the first conductive layer where the first ridge is arranged and extends to the end of the first ridge. The first ridge is surrounded by protruding pins constituting the metamaterial structure along both sides of the extension direction of the ridge and around the end of the ridge. The metamaterial structures confide wave propagation along the intended waveguiding path along the ridge and into the aperture, i.e., the metamaterial structure is arranged along a perimeter of the waveguide path. The metamaterial structure does not necessarily perfectly surround the ridge; there may some parts without a metamaterial structure and the wave propagation would still be largely confined. For example, there may not necessarily be any metamaterial structure in the extension direction of the ridge after the end of the ridge. However, arranging metamaterial in that location is preferred to maximize wave confinement and thereby isolation.

The aperture 131 is preferably an elongated slot. An elongated slot normally has a length in an extension direction which is much larger than its width. For example, the width can be a fifth of the length. The length is normally about half a guided wavelength of the operational frequency. The elongated slot is preferably rectangular, but may have rounded corners or have other shapes such as oval or a dumbbell shape. In general, however, the aperture can have other shapes, such as circular. The quasi-TEM modes of the ridge gap waveguides on the first and second layers are matched via the elongated slot by means of the ridge matching sections. Although the aperture may be other resonant structures than a slot, the slot provides a compact arrangement.

The elongated slot may be perpendicular with respect to a respective elongation direction of the first and/or the second ridge 111,121. In other words, the elongation direction of the slot is perpendicular with respect to a respective elongation direction of the first and/or the second ridge. In FIGS. 1-3, the slot is perpendicular relative to both ridges. This is preferred since it provides a very wide bandwidth as well a robust performance with less sensitivity to fabrication and assembly tolerances.

The ridge matching section 112,122 may comprise a section with increased width and/or height with respect to the remainder of the ridge 111,121, where the height is in the normal direction of the conducive layer 110,120 and the width is in a direction perpendicular to an extension direction of the ridge. Preferably, the ridge matching sections comprise both a different height and a different width. Such matching section is illustrated in FIGS. 1-6. The transition from the ridge to the matching section, i.e., the change in height and/or width, can be in one or more discrete steps or be gradual. Thereafter, the matching section preferably comprises a section with constant height and width.

The first and/or the second ridges 111,121 preferably have a height of about ⅛ wavelengths and a width of about ⅙ wavelengths of the operational frequency, where the height is in the normal direction of the conducive layer 110,120 and the width is in a direction perpendicular to an extension direction of the ridge. The distance from a normal direction of the extension direction of the ridge to the metamaterial structure is preferably similar to the width of the ridge, i.e., a distance from an edge of the ridge to metamaterial structure (e.g., a row of pins). The distance from the top of the ridge to the third conductive layer 130 is preferably about 1/20 wavelengths of the operational frequency. These dimensions strongly affect the cut off frequency of the guiding wave of the ridge gap waveguide, its impedance, as well as ohmic losses. These example dimensions are found particularly suitable.

Considering these preferred dimensions of the ridges, the respective matching section preferably have a height of ⅙ wavelengths and a width of ¼ wavelengths of the operational frequency. Furthermore, the ridge matching section preferably extend along the extension direction of the ridge with a length of ⅙ wavelengths.

Alternatively, according to aspects, the respective matching section may have a height of 1.1 to 1.5 times larger than the height of the rest of the corresponding ridge and a width of 1.1 to 1.5 times larger than the width of the rest of the corresponding ridge. Furthermore, the ridge matching section may have length of 0.3-2 times the width of the rest of the corresponding ridge, where the length is in the extension direction of the ridge.

The dimension of the ridge matching sections and relative position to the coupling aperture may be selected to have a minimum sensitivity to fabrication and assembly tolerances.

In FIGS. 1-3, the second ridge 121 provides a continuation of the wave propagation path in the same extension direction as the first ridge 111. However, the first and the second ridges 111,121 may be mirrored with respect to the aperture 131. An example of such arrangement could be if the first conductive layer 110 in FIGS. 1-3 is rotated 180 degrees along an axel in a normal direction of the layer.

Figure 5:
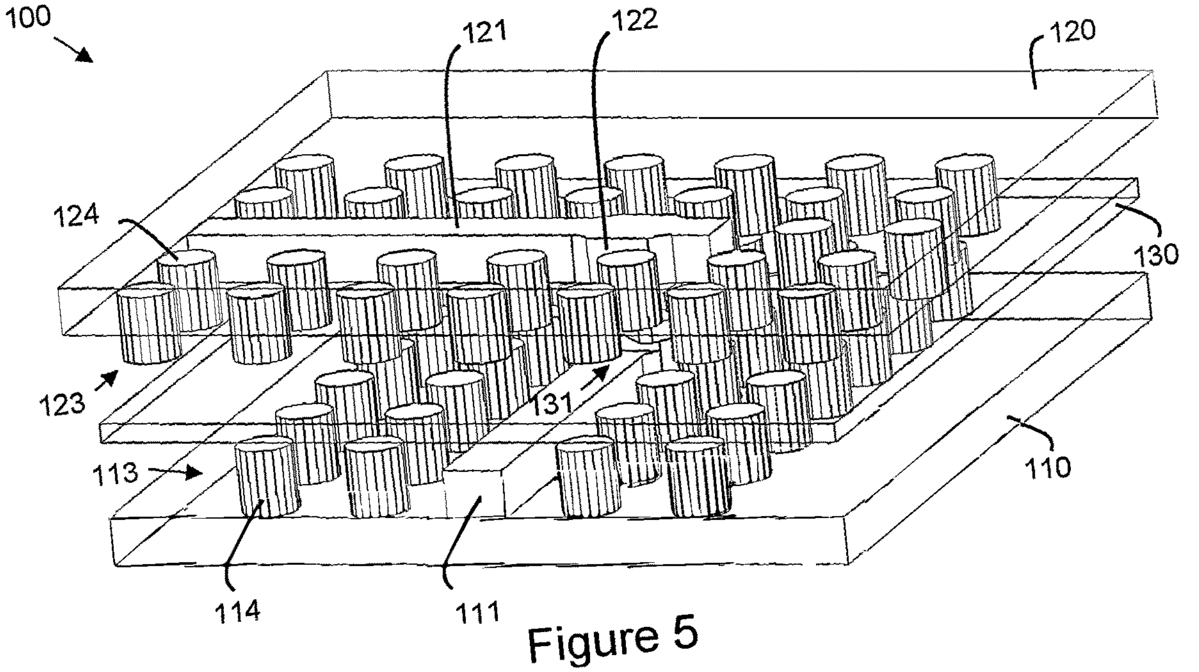
FIG. 5 shows an example transition arrangement.
Figure 6:
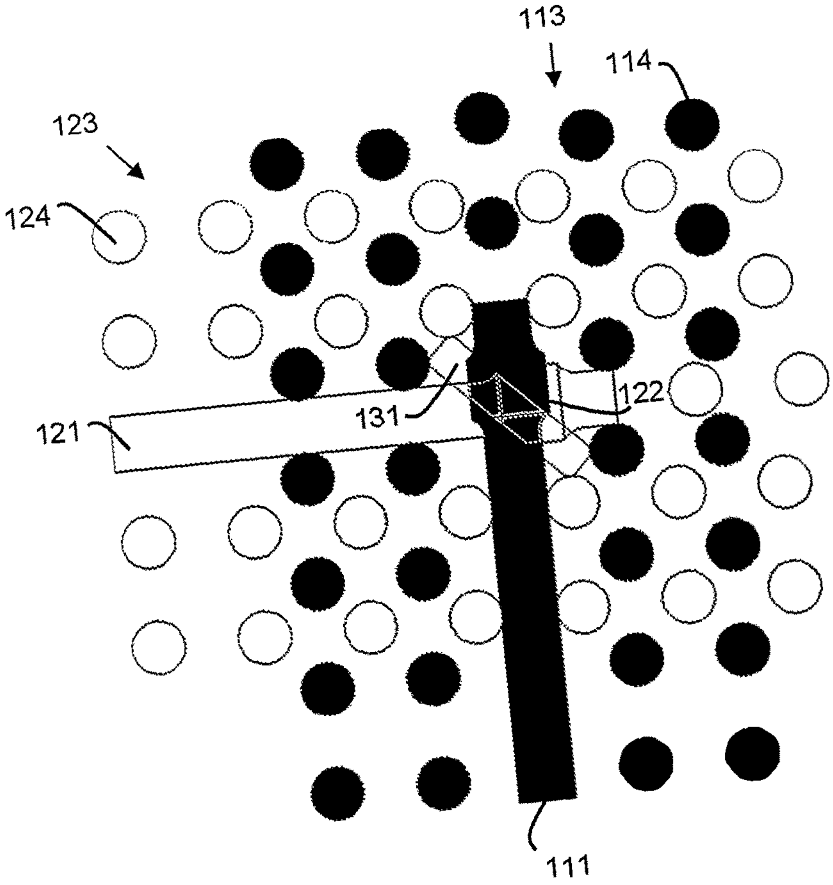
FIG. 6 schematically illustrates an example transition arrangement.

The respective extension directions of the first and the second ridges 111,121 may be parallel, which is the case in the examples of FIGS. 1-3. However, the respective extension directions may alternatively be angled with respect to each other. In that case, the aperture, if it is an elongated slot, is preferably equally angled with respect to both the first and second ridges. For example, if the extension direction of the first ridge is 90 degrees relative to the extension direction of the second ridge, the extension direction of the elongated slot is preferably 45 degrees relative to the extension direction of the first ridge and 45 degrees relative to the extension direction of the second ridge. Such arrangement is shown in FIGS. 5 and 6.

Figure 7A:
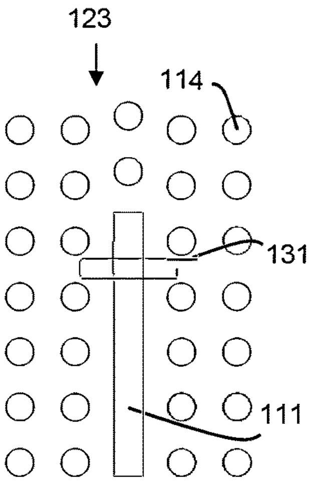
FIGS. 7A-7C schematically illustrate different aperture configurations relative to a ridge.
Figure 7B:
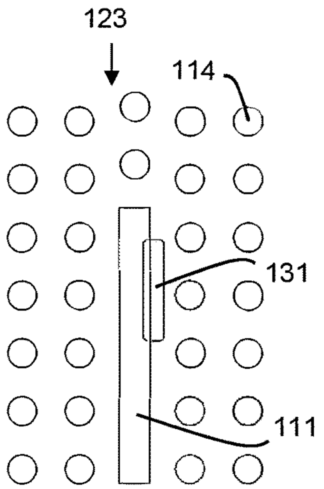
Figure 7C:
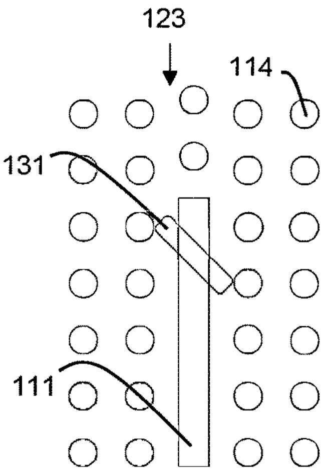

In general, an elongated slot constituting the aperture 131 can have any orientation of its extension direction to any of the ridges. However, as discussed above, certain orientations can provide the best possible matching for various scenarios. FIGS. 7A-7C show various examples, where 7A shows a slot perpendicular to a ridge, 7B shows a slot parallel with the ridge, and 7C shows a slot angled 45 degrees relative to the ridge.

Metamaterial structures are sometimes called electromagnetic bandgap (EBG) structures. The metamaterial structure is normally arranged to form a high-impedance surface, such as an artificial magnetic conductor (AMC). If the high-impedance faces an electrically conductive surface (i.e., a low-impedance surface such as a perfect electric conductor, PEC, in the ideal case), and if the two surfaces are arranged at a distance apart less than a quarter of a wavelength at a center frequency, no electromagnetic waves in a frequency band of operation can, in the ideal case, propagate along or between the in between surfaces since all parallel plate modes are cut-off in that frequency band. In other words, the high-impedance surface, and the low-impedance surface form an electromagnetic bandgap between the two surfaces.

Using metamaterial structures can be arranged such that electromagnetic energy can pass more or less unhindered along an intended waveguiding path, but not in any other direction.

The two surfaces may also be arranged directly adjacent to each other, i.e., electrically connected to each other. In other words, the third layer 130 may be arranged at a distance from the first and/or the second metamaterial structure 113,123, wherein the distance is less than a quarter of a wavelength of the operational frequency. Alternatively, at least a part of the third layer 130 may be in contact with the respective ridge 111,121 and/or the respective metamaterial structure 113,123 on the first and/or the second conducive layer 110,120. The contact can be mechanical and/or electrical.

In a realistic scenario, the electromagnetic waves in the frequency band of operation are attenuated per length along the two surfaces. Herein, to attenuate is interpreted as to significantly reduce an amplitude or power of electromagnetic signal propagation, such as a radio frequency signal. The attenuation is preferably complete, in which case attenuate and block are equivalent, but it is appreciated that such complete attenuation is not always possible to achieve.

The use of metamaterial structures provides high isolation of the transition. Another advantage is that there is no need for electrical contact between any of the first, second, and third layers. This is an advantage since high precision assembly is not necessary since electrical contact need not be verified. Electrical contact between the layers is, however, also an option. In addition, the metamaterial structure provides relaxed tolerances in the exact placements of the layers, i.e., alignment of the two ridges and the aperture, due to the high isolation.

There exists a multitude of metamaterial structures. Such structures often comprise elements arranged in a periodic or quasi-periodic pattern in one, two or three dimensions. Herein, a quasi-periodic pattern is interpreted to mean a pattern that is locally periodic but displays no long-range order. A quasi-periodic pattern may be realized in one, two or three dimensions. As an example, a quasi-periodic pattern can be periodic at length scales below ten times an element spacing, but not at length scales over 100 times the element spacing.

A metamaterial structure may comprise at least two element types, the first type of element comprising an electrically conductive material and the second type of element comprising an electrically insulating material. Elements of the first type may be made from a metal such as copper or aluminum, or from a non-conductive material like PTFE or FR-4 coated with a thin layer of an electrically conductive material like gold or copper. Elements of the first type may also be made from a material with an electric conductivity comparable to that of a metal, such as a carbon nanostructure or electrically conductive polymer. As an example, the electric conductivity of elements of the first type can be above 103 Siemens per meter (S/m). Preferably, the electric conductivity of elements of the first type is above 105 S/m. In other words, the electric conductivity of elements of the first type is high enough that the electromagnetic radiation can induce currents in the elements of the first type, and the electric conductivity of elements of the second type is low enough that no currents can be induced in elements of the second type. Elements of the second type may optionally be non-conductive polymers, vacuum, or air. Examples of such non-conductive element types also comprise FR-4 PCB material, PTFE, plastic, rubber, and silicone.

Elements of the first and second type may be arranged in a pattern characterized by any of translational, rotational, or glide symmetry, or a periodic, quasi-periodic or irregular pattern.

The physical properties of the elements of the second type also determines the dimensions required to obtain attenuation of electromagnetic propagation past the metamaterial structure. Thus, if the second type of material is chosen to be different from air, the required dimensions of the first type of element changes.

The elements of the first type may be arranged in a periodic pattern with some spacing. The spaces between the elements of the first type constitute the elements of the second type. In other words, the elements of the first type are interleaved with elements of the second type. Interleaving of the elements of the first and second type can be achieved in one, two or three dimensions.

A size of an element of either the first or the second type, or both, is smaller than the wavelength in air of electromagnetic radiation in the frequency band. As an example, defining the center frequency as the frequency in the middle of the frequency band, the element size is between ⅕th and 1⁄50th of the wavelength in air of electromagnetic radiation at the center frequency. Here, the element size is interpreted as the size of an element in a direction where the electromagnetic waves are attenuated, e.g., along a surface that acts as a magnetic conductor. As an example, for an element comprising a vertical rod with a circular cross section and with electromagnetic radiation propagating in the horizontal plane, the size of the element corresponds to a length or diameter of the cross section of the rod.

A type of metamaterial structure comprises electrically conductive protrusions on an electrically conductive substrate, i.e., protruding pins. In other words, the first and/or the second metamaterial structure 113,123 may comprises a plurality of protruding conductive elements 114,124. Example protruding elements are shown in FIGS. 1-7C. The protrusions may optionally be encased in a dielectric material. It is appreciated that the protrusions may be formed in many different shapes, like a square, circular, elliptical, rectangular, or more generally shaped cross sections.

It is also possible that the protrusions are mushroom shaped, as in, e.g., a cylindrical rod on an electrically conductive substrate with a flat electrically conductive circle on top of the rod, wherein the circle has a cross section larger than the cross section of the rod, but small enough to leave space for the second element type between the circles in the metamaterial structures. Such a mushroom-shaped protrusion may advantageously be formed in a PCB, wherein the rod comprises a via hole, which may or may not be filled with electrically conductive material.

The protrusions have a length in a direction facing away from the electrically conductive substrate. If the element of the second type is air, the protrusion length may correspond to a quarter of the wavelength in air at the operational frequency. The surface along the tops of the protrusions is then close to a perfect magnetic conductor at the center frequency. Even though the protrusions are only a quarter wavelength long at a single frequency, it presents a high impedance surface at a frequency band around that single frequency. This type of metamaterial structure thus presents a band of frequencies where electromagnetic waves may be attenuated, when the metamaterial structure faces a low impedance surface. In a non-limiting example, the center frequency is 15 GHz and electromagnetic waves in the frequency band 10 to 20 GHz propagating between the metamaterial structure and an electrically conductive surface are attenuated.

As another example, a type of metamaterial structure comprises a single slab of electrically conductive material into which cavities have been introduced. The cavities may be air-filled or filled with a non-conductive material. It is appreciated that the cavities may be formed in different shapes such as elliptical, circular, rectangular, or more general cross section shapes. In general, the length (in a direction facing away from the electrically conductive substrate) corresponds to a quarter of the wavelength at the operational frequency.

There is also disclosed herein an antenna arrangement comprising the transition arrangement 100 according to the discussion above. According to aspects, in the antenna arrangement, the first conducive layer 110 comprises a third ridge arranged on an opposite surface on the layer compared to the first ridge 111, and/or the second conducive layer 120 comprises a fourth ridge arranged on an opposite surface on the layer compared to the second ridge 121.

Furthermore, there is disclosed herein a radio or radar transceiver comprising the transition arrangement 100 and/or the antenna arrangement. In addition, there is disclosed herein a vehicle comprising the transition arrangement 100, the antenna arrangement, and/or the radio or radar transceiver.

What is claimed is:

1. A transition arrangement for a transition between two ridge gap waveguides, the transition arrangement comprising a first conductive layer, a second conductive layer, and a third conductive layer in a stacked layer configuration, wherein the first conducive layer comprises a first ridge arranged along a first waveguiding path, and a first metamaterial structure arranged along a perimeter of the first waveguide path, and wherein the second conducive layer comprises a second ridge arranged along a second waveguiding path, and a second metamaterial structure arranged along a perimeter of the second waveguide path, and wherein the third conductive layer is arranged in between the first and the second conductive layers, where the third conductive layer comprises respective planar surfaces facing the first and the second first metamaterial structures, respectively, the third conductive layer comprising an aperture arranged in connection to the first and the second ridges to couple electromagnetic waves between the first and the second ridges, wherein the first and/or the second ridge comprises a respective ridge matching section in connection to the aperture and preferably facing the aperture.

2. The transition arrangement according to claim 1, wherein the aperture is arranged less than a half wavelength of an operational frequency from a respective end of the first and/or the second ridge.

3. The transition arrangement according to claim 1, wherein the respective extension directions of the first and the second ridges are parallel.

4. The transition arrangement according to claim 1, wherein the respective extension directions of the first and the second ridges are angled with respect to each other.

5. The transition arrangement according to claim 1, wherein the first and the second ridges are mirrored with respect to the aperture.

6. The transition arrangement according to claim 1, wherein the aperture is an elongated slot.

7. The transition arrangement according to claim 6, wherein the elongated slot is perpendicular with respect to a respective elongation direction of the first and/or the second ridge.

8. The transition arrangement according to claim 1, wherein the ridge matching section comprises a section with increased width and/or height with respect to the remainder of the ridge, where the height is in the normal direction of the conducive layer and the width is in a direction perpendicular to an extension direction of the ridge.

9. The transition arrangement according to claim 1, wherein a thickness of the third layer is less than a tenth of a wavelength of an operational frequency.

10. The transition arrangement according to claim 1, wherein at least a part of the third layer is in contact with the respective ridge and/or the respective metamaterial structure on the first and/or the second conducive layer.

11. The transition arrangement according to claim 1, wherein the third layer is arranged at a distance from the first and/or the second metamaterial structure, wherein the distance is less than a quarter of a wavelength of an operational frequency.

12. The transition arrangement according to claim 1, wherein the first and/or the second metamaterial structure comprises a plurality of protruding conductive elements.

13. An antenna arrangement comprising the transition arrangement according to claim 1.

14. The antenna arrangement according to claim 13, wherein the first conducive layer comprises a third ridge arranged on an opposite surface on the layer compared to the first ridge, and/or wherein the second conducive layer comprises a fourth ridge arranged on an opposite surface on the layer compared to the second ridge.

15. A radio or radar transceiver comprising the transition arrangement according to claim 1.

16. A vehicle comprising the transition arrangement according to claim 1.

17. A vehicle comprising the transition arrangement according to claim 1.

18. A vehicle comprising the antenna arrangement according to claim 13.

19. A vehicle comprising the radio or radar transceiver according to claim 15.

* * * * *